(12) United States Patent
Willobee et al.

(10) Patent No.: US 7,780,451 B2
(45) Date of Patent: Aug. 24, 2010

(54) SHOULDER MODEL FOR SHOULDER ARTHROSCOPY

(75) Inventors: James A. Willobee, Bonita Springs, FL (US); Jeffrey Wyman, Naples, FL (US)

(73) Assignee: Arthrex, Inc., Napels, FL (US)

( * ) Notice: Subject to any disclaimer, the term of this patent is extended or adjusted under 35 U.S.C. 154(b) by 317 days.

(21) Appl. No.: 11/935,250

(22) Filed: Nov. 5, 2007

(65) Prior Publication Data

US 2008/0114460 A1 May 15, 2008

Related U.S. Application Data

(60) Provisional application No. 60/857,195, filed on Nov. 7, 2006.

(51) Int. Cl.
*G09B 23/28* (2006.01)

(52) U.S. Cl. ..................................... 434/267

(58) Field of Classification Search ................. 434/262, 434/267, 274, 275
See application file for complete search history.

(56) References Cited

U.S. PATENT DOCUMENTS

| | | | | |
|---|---|---|---|---|
| 4,433,961 | A * | 2/1984 | Chandler | 434/274 |
| 4,838,795 | A * | 6/1989 | Draenert | 434/274 |
| 6,361,729 | B1 * | 3/2002 | Strover et al. | 264/247 |
| 6,957,961 | B1 * | 10/2005 | Owens et al. | 434/270 |
| 7,322,826 | B2 * | 1/2008 | Zeeff | 434/267 |
| 7,384,268 | B2 * | 6/2008 | Browne-Wilkinson | 434/274 |

FOREIGN PATENT DOCUMENTS

| | | |
|---|---|---|
| DE | 94 08 749 | 8/1994 |
| EP | 1 205 295 A1 | 5/2002 |
| GB | 2 284 166 | 5/1995 |
| WO | WO 98/20473 | 5/1998 |

* cited by examiner

*Primary Examiner*—Kurt Fernstrom
(74) *Attorney, Agent, or Firm*—Dickstein Shapiro LLP

(57) ABSTRACT

A shoulder model and methods of shoulder arthroscopy using the shoulder model. The shoulder model includes an acromioclavicular (AC) joint assembly, a joint capsule assembly, a scapula mount, a shoulder musculature, a skin, and a base. The AC joint assembly is mounted on the scapula mount and the joint assembly is attached to the AC joint assembly and fastened using a screw/nut to form the shoulder assembly. The shoulder assembly is placed in the shoulder musculature and the skin is rolled over the shoulder musculature and zipped in place. The bones of the shoulder assembly are made of foam-cortical shell, the shoulder musculature is made of foam, the soft tissue components are made of thermoplastic elastomers, and the skin is made of vinyl. A method of practicing shoulder arthroscopy using the shoulder model includes mounting the shoulder model in a beach chair position, making anatomical references, establishing a posterior viewing portal, inserting cannulas into the glenohumeral joint or the subacromial space, creating a labral disruption or a rotator cuff tear, and repairing the rotator cuff tear or labral disruption.

16 Claims, 15 Drawing Sheets

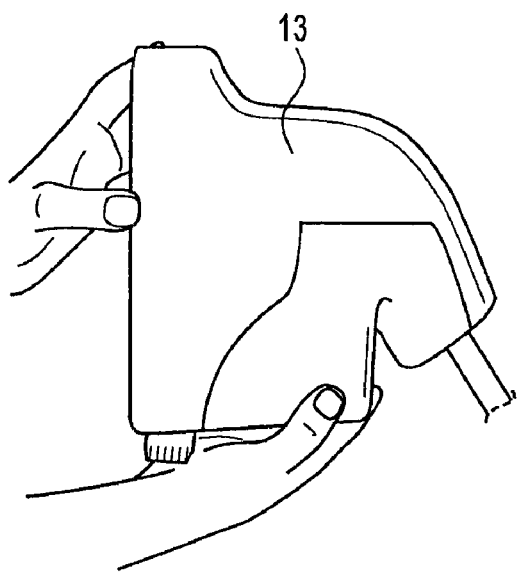
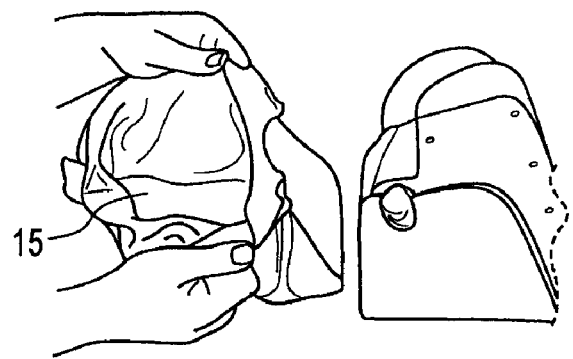
FIG. 2E　　　　FIG. 2F
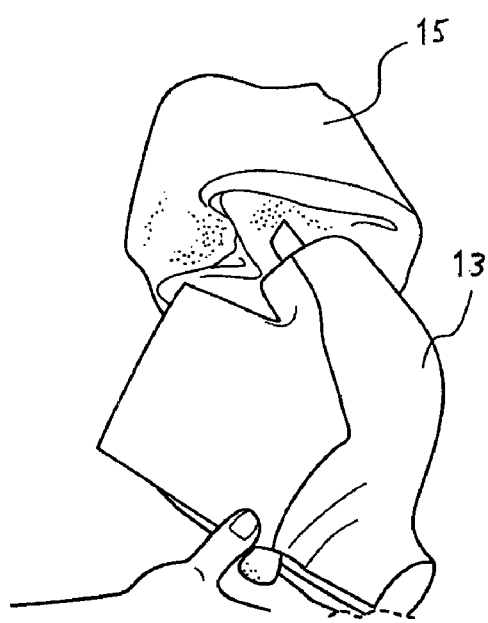
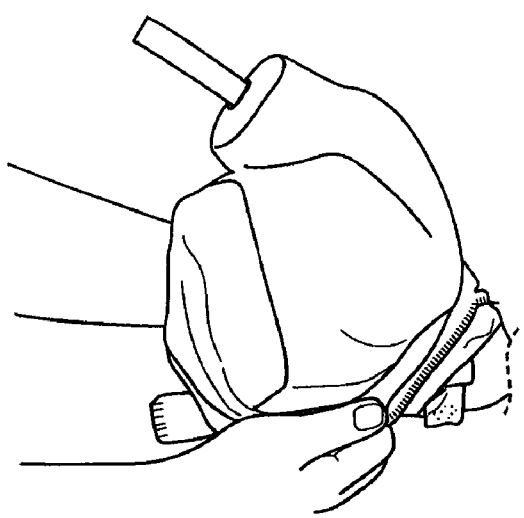
FIG. 2G　　　　FIG. 2H

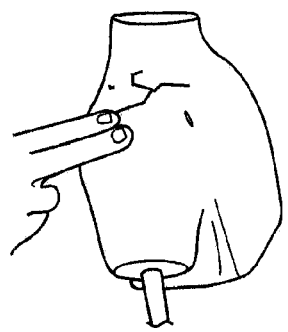
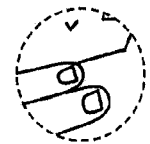
FIG. 7A    FIG. 7A-1
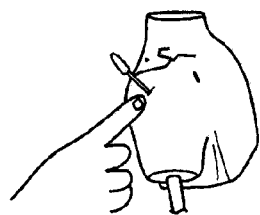
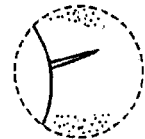
FIG. 7B    FIG. 7B-1
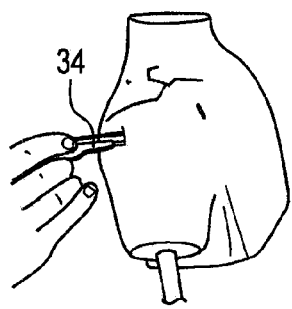
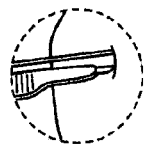
FIG. 7C    FIG. 7C-1
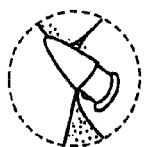
FIG. 7D    FIG. 7D-1

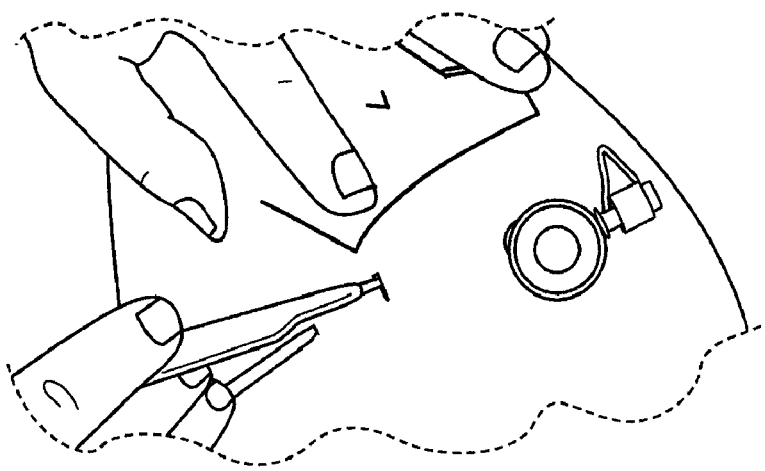
FIG. 7E
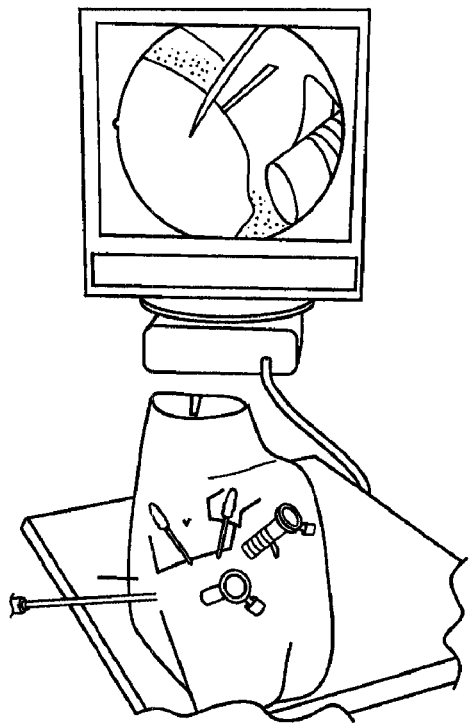
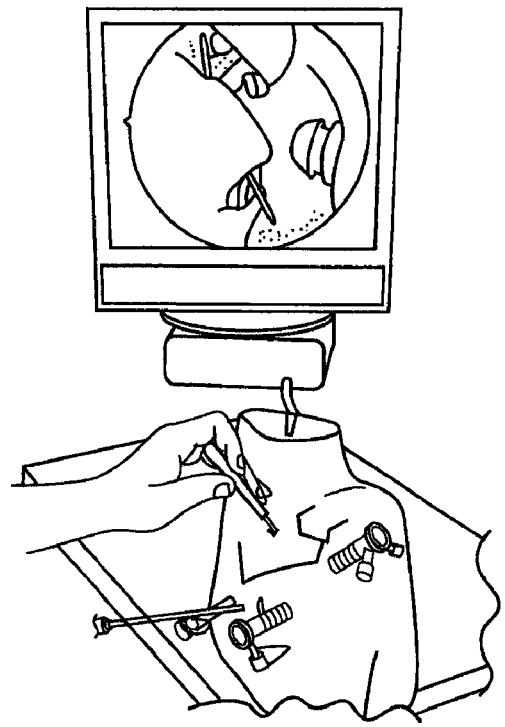
FIG. 7F          FIG. 7G

SHOULDER MODEL FOR SHOULDER ARTHROSCOPY

CROSS-REFERENCE TO RELATED APPLICATIONS

This application claims priority to U.S. Provisional Application No. 60/857,195, filed on Nov. 7, 2006, the entire disclosure of which is hereby incorporated by reference.

BACKGROUND OF THE INVENTION

1. Field of the Invention

The present invention relates to the field of surgery and, in particular, to a shoulder model and methods of shoulder arthroscopy using the shoulder model.

2. Description of the Related Art

A human shoulder includes 3 bones—the clavicle (collarbone), the scapula (shoulder blade), and the humerus (upper arm bone)—and two joints. The joints are the acromioclavicular (AC) joint and the glenohumeral joint, which is the traditional "ball-and-socket." The bones of the shoulder are held together by muscles, tendons (attach muscles to bones), and ligaments (attach bones to bones).

The "rotator cuff" is used to describe the group of muscles and their tendons in the shoulder that hold the "ball" (the humeral head) in the "socket" (the glenoid) and helps control the shoulder joint motion. The muscles—supraspinatus at the top (superior) of the shoulder, subscapularis in the front (anterior), and infraspinatus and teres minor behind (posterior)—insert or attach to the humeral head by way of their tendons. These muscles help keep the ball centered within the socket.

Above the rotator cuff is a bony projection from the scapula (shoulder blade) called the acromion. The acromion forms the "ceiling" of the shoulder, serves as the point of origin for the deltoid muscle, and joins the clavicle (collarbone) to form the acromioclavicular (AC) joint. Between the rotator cuff tendons and the acromion is a protective fluid-filled sack called "bursa."

Other terms used in describing the anatomy of a shoulder are: "capsule" (a pocket that provides stability); and "labrum" (a rim of cartilage to which the capsule attaches).

Tears may be located either superior or inferior to the middle of the glenoid socket. A superior labrum anterior-posterior (SLAP) lesion is a tear of the rim above the middle of the socket that may also involve the biceps tendon. A Bankart lesion is a tear of the rim below the middle of the glenoid socket that also involves the inferior glenohumeral ligament. Typically, rotator cuff tears occur in the supraspinatus but other muscles—subscapularis, infraspinatus, and teres minor—may also be involved.

The arthroscopic anatomy of a shoulder joint is typically divided into five regions: anterior (nose-end), posterior (tail-end), superior (head-end), inferior (feet-end), and central. The posterior approach to the shoulder provides better orientation and the widest field of view amongst all of the approaches. On the other hand, the superior approach may cause damage to a critical area of supraspinatus tendon and its application is typically not recommended.

Generally, arthroscopic procedures are experimented on fresh cadaver specimens. In many instances, however, cadaver specimens may be unavailable or even undesirable as a biohazard.

Thus, there is a need for a shoulder model that enables a surgeon to practice open surgical procedures and arthroscopic procedures in a clean and dry setting, to perform the procedure with repeatability by placing arthroscopic cannulas, and to use in lieu of cadaver specimens. There is also a need for a shoulder model that replicates the features of a human shoulder and can be easily transported, assembled, and refurbished with new components.

SUMMARY OF THE INVENTION

The present invention fulfills the needs noted above by providing a shoulder model for open surgical procedures and arthroscopic procedures with critical anatomical structures important for a surgeon to identify and reference when performing shoulder arthroscopy, shoulder reconstruction, joint replacement, fracture care, joint reconstruction or biceps tenodesis.

The shoulder model of the present invention has a number of significant advantageous features as compared to cadaveric specimens or other known shoulder models: it enables both dry arthroscopy and wet arthroscopy (i.e., it is watertight); it allows realistic cannula placement; it features palpation/soft tissue, realistic cannula placement, humerus rotation, clavicle mobility; it can be implanted with both bioabsorbable and metal anchors for instability (glenoid) repairs and rotator cuff (humerus) repairs; it can be used to practice open and arthroscopic AC joint reconstruction, open and arthroscopic biceps tenodesis; and it allows unlimited percutaneous, i.e., through the skin, access. A user may simulate surgical pathologic conditions prior to or at the time of a training exercise using the shoulder model. For example, rotator cuff tears, labral disruptions, bony defects, or ligamentous disruption of the AC joint may be simulated using the shoulder model. Because the model enables dry arthroscopy, it may be used in any environment including a desktop in a surgeon's office. It has no expiration date and presents no storage issues.

The shoulder model of the present invention advantageously allows surgeons to experiment with posterior and anterior labrum repair, slap lesion, rotator cuff repair, and arthroscopic repairs of the AC joint and the glenohumeral joint.

The shoulder model of the present invention includes an AC joint assembly which is mounted on a scapula mount. A joint capsule assembly is then attached to the AC joint assembly and fastened using a screw/nut and the assembled parts are referred to herein as the shoulder assembly. The shoulder assembly is formed of specific bone density to enable anchoring of bioabsorbable and metal anchors in the glenoid and the humerus and drilling of holes through the clavicle. The shoulder assembly is then placed in a shoulder musculature. The shoulder musculature mimics the musculature of the shoulder and the surrounding soft tissues. A skin of material, for example, vinyl is rolled over the shoulder musculature and is zipped in place. The shoulder model may be formed, for example, of molded polymers which creates a realistic feel of the bone and soft tissue during anchor or screw placement, suture passage, and knot tying. For arthroscopic procedures, for example, arthroscopy of the glenohumeral joint and/or the subacromial space, a fiber-optic visualization camera and a light source are also required.

The present invention also includes a method of practicing shoulder arthroscopy using the shoulder model of the present invention. In an embodiment of the present invention, the method includes the steps of providing a shoulder model, as described above, and mounting the shoulder model in a beach chair position or a lateral decubitus position for dry lab use. Anatomical references are made on the shoulder model. A viewing portal, preferably a posterior portal, is established for the subacromial space or the glenohumeral joint. Cannula(s) is inserted into the glenohumeral joint or the subacromial space through portal(s) created anteriorly or posteriorly. A rotator cuff tear or labral disruption is created using an arthroscopic grasper placed into the portal with arthroscopic scissors or forceps.

In another embodiment of the present invention, for wet lab use, a scapular clamp is applied to the posteromedial corner of the shoulder model, about 15 cm up from a bottom of the shoulder model. The clamp is opened wide enough to capture the post-mount within the skin and the shoulder musculature, or the zipper is opened by allowing one jaw of the clamp to contact the scapula and mounting post directly.

These and other features and advantages of the present invention will become apparent from the following description of the invention that is provided in connection with the accompanying drawings and illustrated embodiments of the invention.

BRIEF DESCRIPTION OF THE DRAWINGS

FIGS. 2A-2L illustrate the sequence steps for assembling a shoulder model of the present invention;

FIGS. 7A-7D illustrate a method of placing a standard lateral portal to view the subacromial space and to place cannulas in the space, performed in accordance with the present invention;

FIG. 7E shows a method of creating posterolateral portal, performed in accordance with the present invention;

FIG. 7F shows a method of creating off-acromion percutaneous access, performed in accordance with the present invention;

FIG. 7G shows a method of creating a modified Neviaser (superior-medial) portal, performed in accordance with the present invention;

DETAILED DESCRIPTION OF THE PREFERRED EMBODIMENTS

Figure 1A:
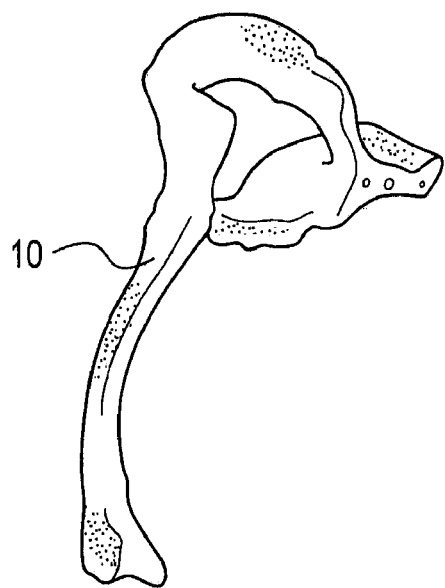
FIGS. 1A-1G illustrate perspective views of various components of a shoulder model of the present invention.
Figure 1B:
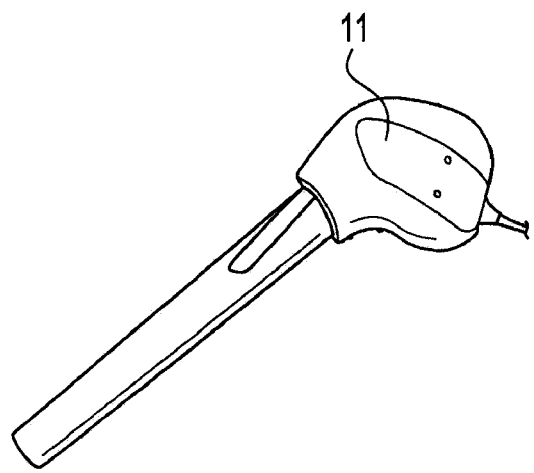
Figure 1C:
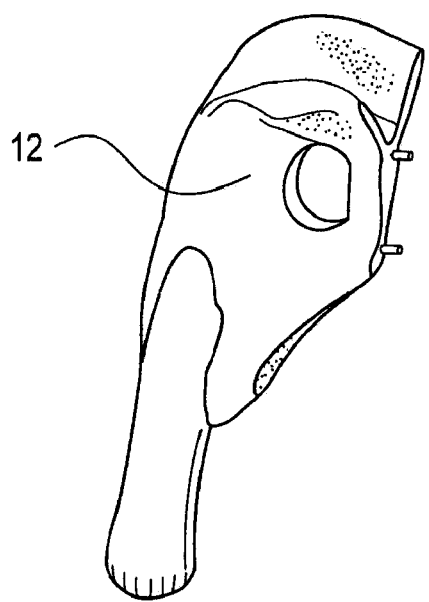
Figure 1D:
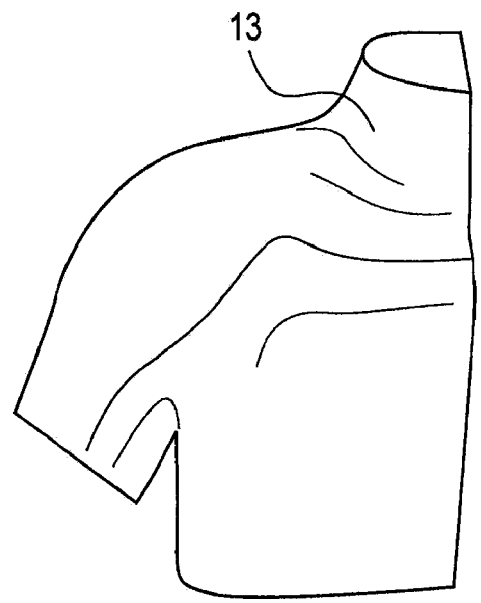
Figure 1E:
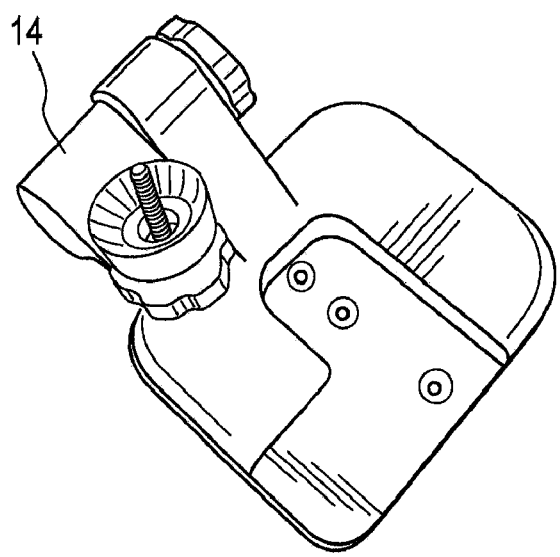
Figure 1F:
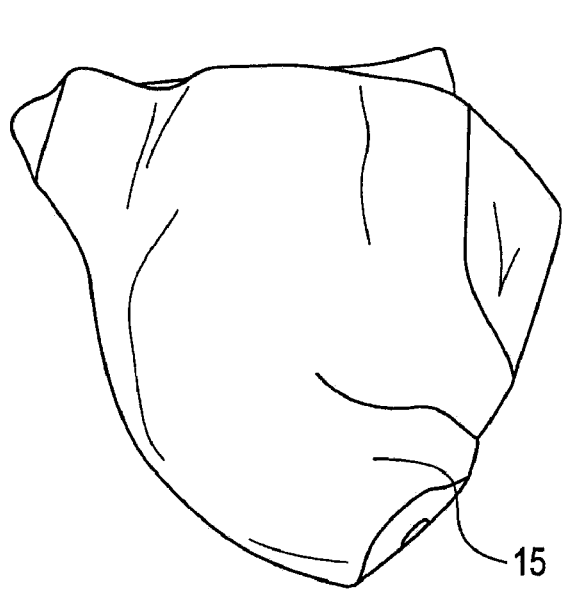
Figure 1G:
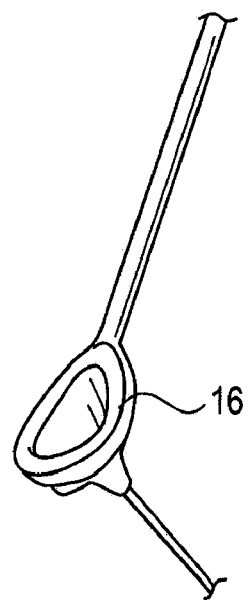

The present invention relates to a shoulder model and methods of shoulder arthroscopy which utilize the shoulder model of the present invention.

The shoulder model 100 (FIG. 2L) of the present invention is formed of an acromioclavicular (AC) joint assembly 10, a joint capsule assembly 11, a scapula and mounting post 12, a shoulder musculature 13, a labrum glenoid assembly 16, a skin 15, and a base 14, as shown in FIGS. 1A-1G. The AC joint assembly 10, the joint capsule assembly 11, the scapula and mounting post 12, the shoulder musculature 13, the labrum glenoid assembly 16, the skin 15, and the base 14 may preferably be PS-012-2, PS-012-3, PS-012-4, PS-012-5, PS-012-8, PS-012-7, and PS-012-6, respectively, all sold by Arthrex, Inc. of Naples, Fla. A thumb nut, for example, PS-012-9, sold by Arthrex, Inc. of Naples, Fla., or other securing means known in the art may be used to secure the AC joint assembly 10, the joint capsule assembly 11, and the scapula and mounting post 12. The shoulder model 100 may be, for example, a PS-012, sold by Arthrex, Inc. of Naples, Fla.

The skin 15 may be formed, for example, of a formulation of vinyl molded to replicate the external anatomy of a shoulder, to form a tight seal around protruding bony components, to be adhesive for zipper attachment and for easy repair using SuperGlue. The bones, including the scapula, may be formed of foam-cortical shell, sold by Pacific Research Laboratories of Vashon, Wash. The soft tissue components, including labrum and biceps tendon, rotator cuff, and capsule, may be formed of rotationally molded thermoplastic elastomers, sold by RTP Company of Winona, Minn., or Teknor Apex of Pawtucket, R.I. The solid non-surgical structural elements, including mounting post 12 and AC joint assembly 10, may be a polymer material, sold by Pacific Research Laboratories of Vashon, Wash. The shoulder musculature 13 may preferably be formed of foam, specifically chosen to mimic the musculature of the shoulder.

Figure 2A:
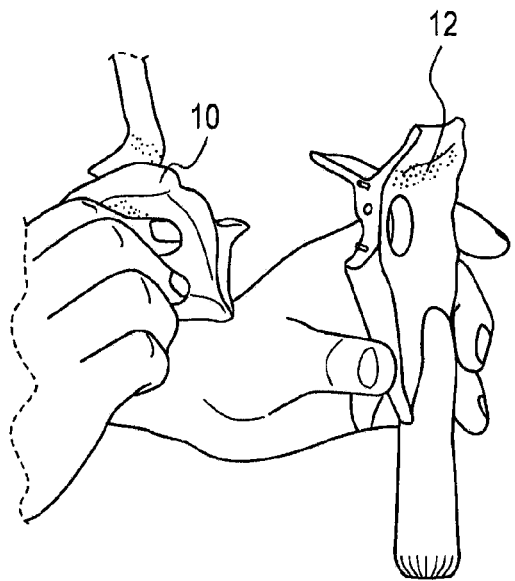
Figure 2B:
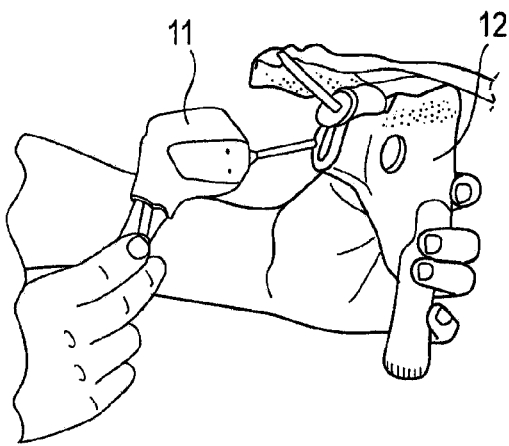
Figure 2C:
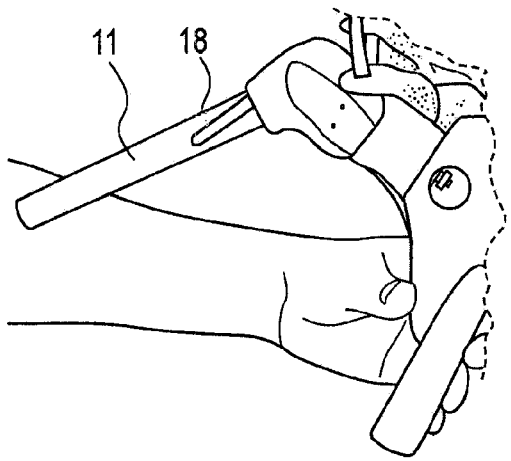
Figure 2D:
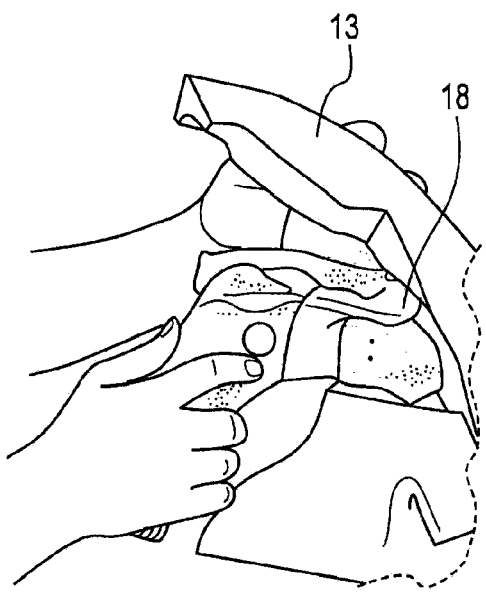
Figures 1, 2C:
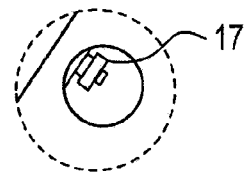
Figure 2I:
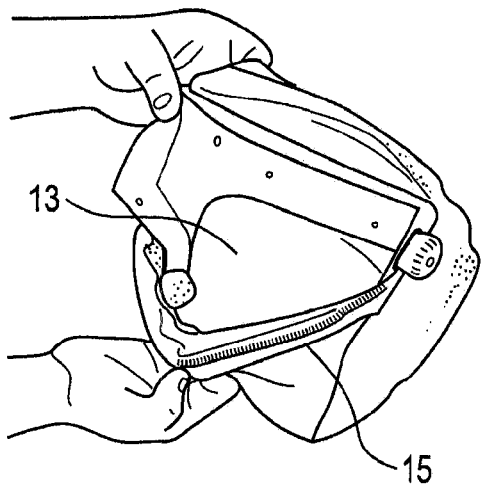
Figure 2J:
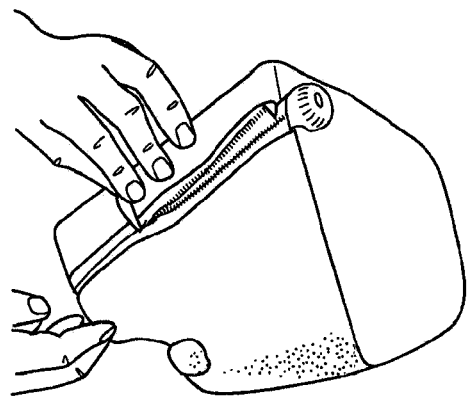
Figure 2K:
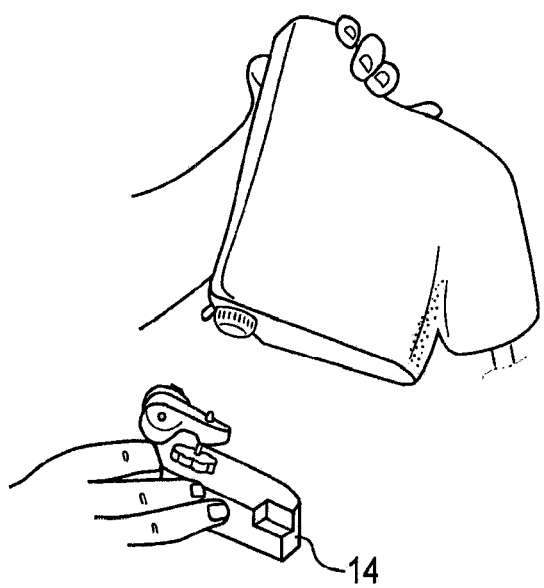
Figure 2L:
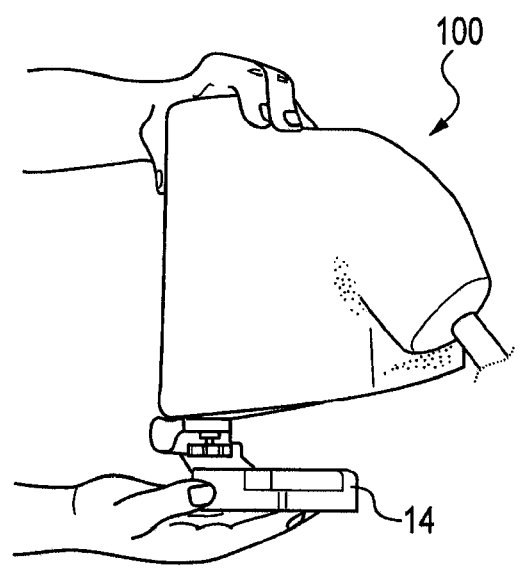

The shoulder model 100 (FIG. 2L) of the present invention is assembled, as shown in FIGS. 2A-2L. First, the AC joint assembly 10 is mounted onto a scapula mount 12, as shown in FIG. 2A. Referring to FIGS. 2B-2C, a joint capsule assembly 11 is then attached to the AC joint assembly 10 and fastened using a screw/nut 17. The AC joint assembly 10, the scapula mount 12, and the joint capsule assembly 11 will be referred to herein as shoulder assembly 18. The shoulder assembly 18 is formed of specific bone density to enable anchoring of bioabsorbable and metal anchors in the glenoid and the humerus and drilling of holes through the clavicle. The shoulder assembly 18 is then placed in a shoulder musculature 13 and the shoulder musculature 13 is closed from rear view with all components within, as shown in FIGS. 2D-2E. The shoulder musculature 13 mimics the musculature of the shoulder and the surrounding soft tissues. A skin 15 of material, for example, vinyl is rolled over the shoulder musculature 13 and is zipped in place, as shown in FIGS. 2F-2J. Referring to FIGS. 2K-2L, the shoulder assembly 18 is mounted on a base 14 to complete the shoulder model 100. The shoulder model 100 may be formed, for example, of molded polymers which creates a realistic feel of the bone and soft tissue during anchor or screw placement, suture passage, and knot tying.

For arthroscopic procedures, for example, arthroscopy of the glenohumeral joint and/or the subacromial space, a fiberoptic visualization camera and a light source are also required.

The method of the present invention includes the steps of mounting the shoulder model 100 (FIG. 2L), making anatomical references, establishing a posterior viewing portal, and inserting cannulas into the glenohumeral joint or the subacromial space.

Mounting the Shoulder Model

Figure 3A:
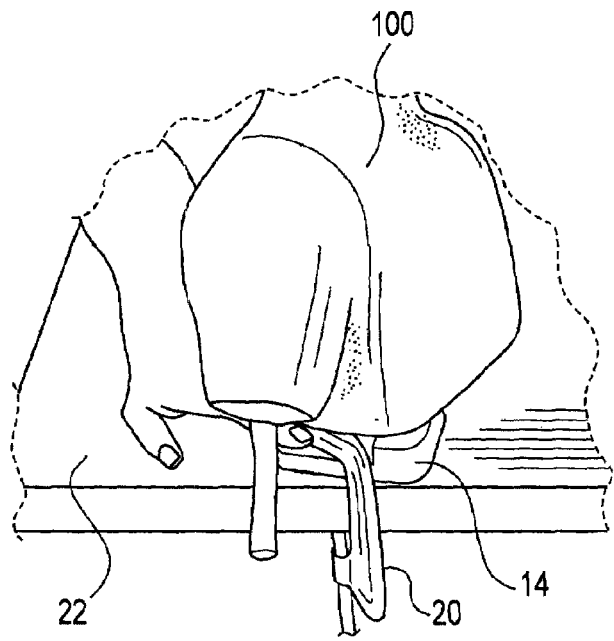
FIG. 3A illustrates the step of mounting a shoulder model of the present invention, showing the model clamped to a table in a beach chair position, performed in accordance with the present invention.
Figure 3B:
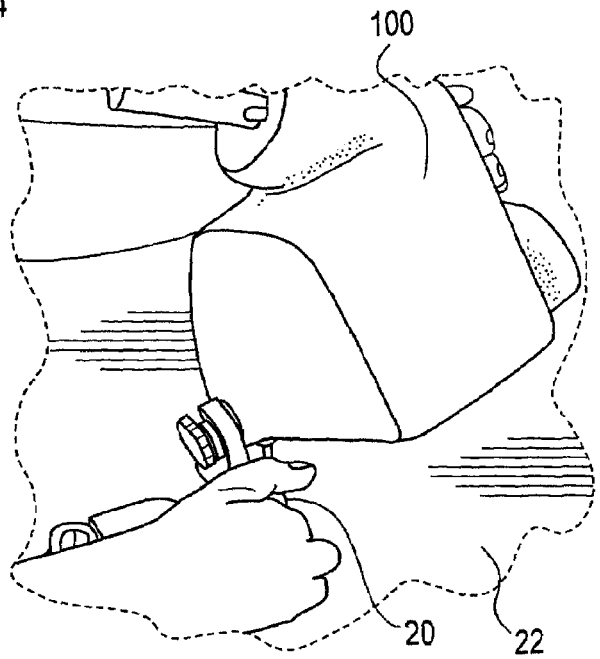
FIG. 3B illustrates the step of mounting a shoulder model of the present invention, showing the model clamped to a table in a lateral decubitus position, performed in accordance with the present invention.

In one embodiment, the shoulder model 100 is mounted in a beach chair position or a lateral decubitus position, as shown in FIGS. 3A-3B. For dry lab work, the base 14 of the shoulder model 100 is secured to a flat surface 22 using a C-clamp 20, preferably a 4"-clamp.

Figure 3C:
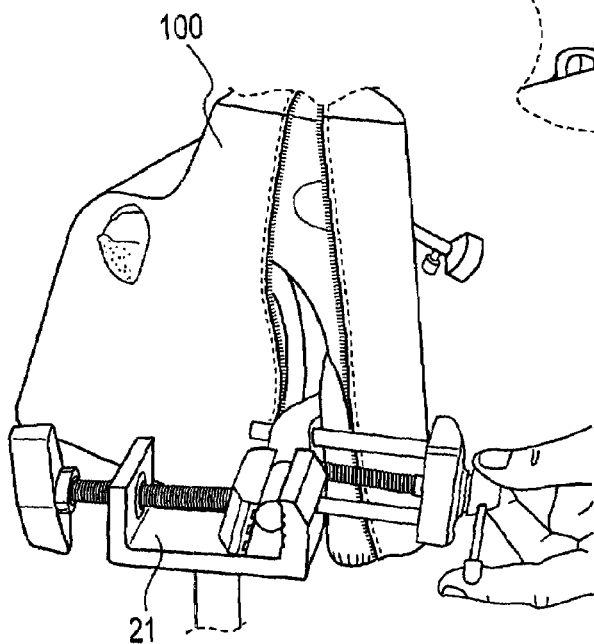
FIG. 3C illustrates the step of mounting a shoulder model of the present invention, showing the model's flat side with a clamp in place, inside the zipper, performed in accordance with the present invention.

In yet another embodiment, for wet lab use, as shown in FIG. 3C, a scapular clamp 21 is applied to the posteromedial corner of the shoulder model 100, approximately 15 cm up from a bottom of the shoulder model 100. The clamp 21 is opened wide enough to capture the post-mount within the skin 15 and the shoulder musculature 13, or the zipper is opened by allowing one jaw of the clamp 21 to contact the scapula and mounting post 12 directly.

Making Anatomical References

Figure 4A:
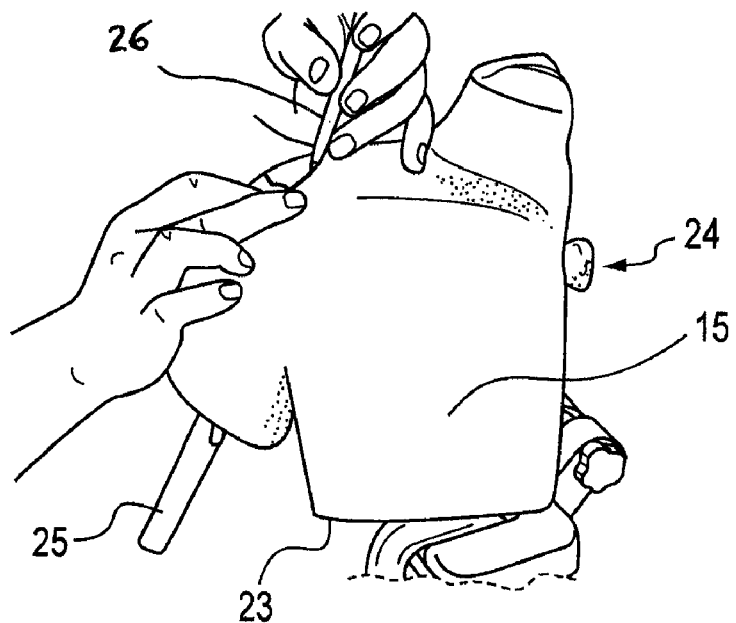
FIG. 4A illustrates a perspective view of a shoulder model of the present invention, with a biceps tendon exiting a distal humerus and a medial flat side with protruding clavicle, showing the step of marking the skin for anatomical references, performed in accordance with the present invention.
Figure 4B:
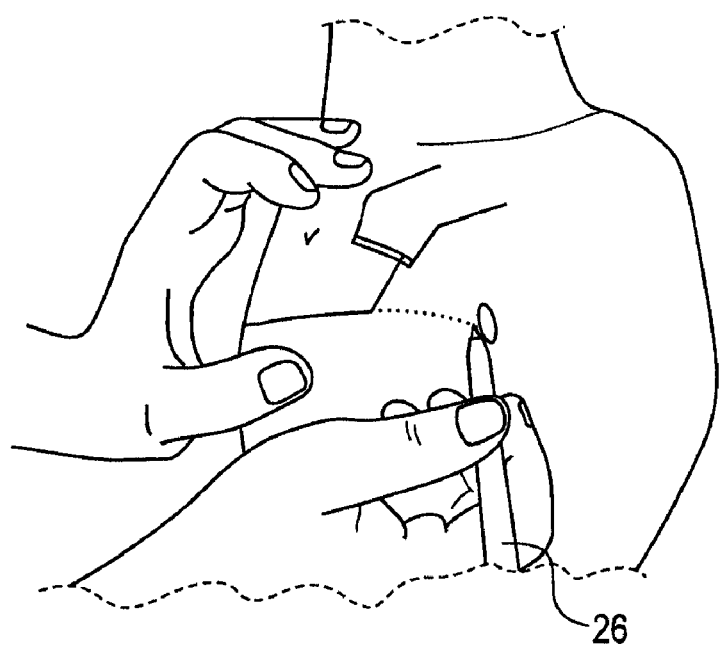
FIG. 4B illustrates a perspective view of a shoulder model of the present invention, showing a human hand palpating bony landmarks and marking the skin, performed in accordance with the present invention.

As shown in FIG. 4A, the biceps tendon 23 of shoulder model 100 exits the skin 15 adjacent to the rotating humeral shaft 25. The medial head of the clavicle 24 exits the skin medially and is useful for manipulating the acromioclavicular (AC) joint. The bony prominences are palpated for anatomical reference. The borders of the acromion are outlined using a skin marker 26. As shown in FIG. 4B, the distal clavicle and acromioclavicular joint are outlined and the coracoid process is marked. Also, a "V" is marked at the medial border of the acromion, midpoint between the acromioclavicular joint and the scapular spine, and the position of the coracoacromial (CA) ligament.

Establishing Viewing Portals

A. Posterolateral Viewing Portal

A posterolateral viewing portal is a percutaneous portal. The posterolateral viewing portal is placed about 1-2 cm off the posterior edge of the acromion, as shown in FIG. 7E. The posterolateral viewing portal provides for better visualization of rotator cuff pathology, and opens up the posterior cannula for suture management.

B. Posterior Viewing Portal

Subacromial Space

Figure 5A:
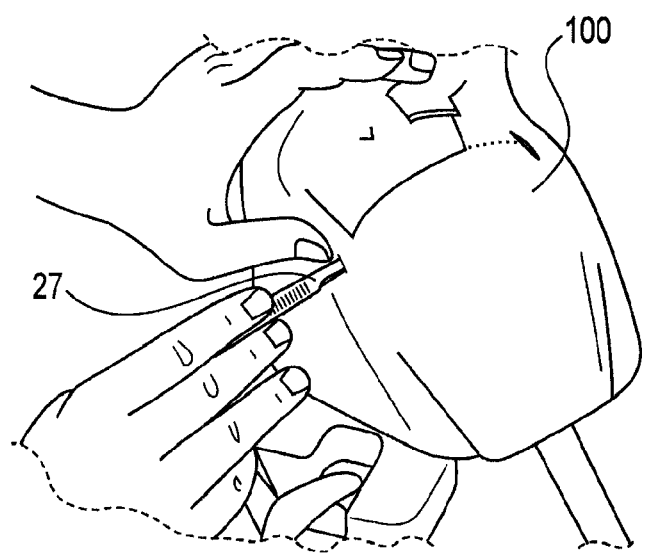
FIG. 5A illustrates a perspective view of a shoulder model of the present invention, showing a human hand making a posterior portal, performed in accordance with the present invention.
Figure 5C:
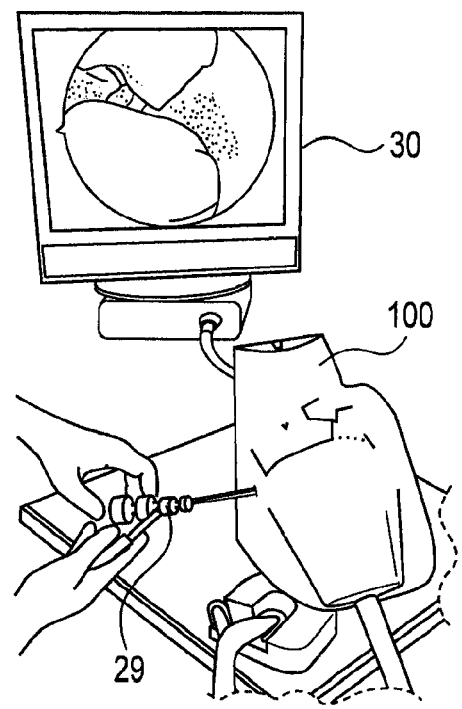
FIG. 5C illustrates a perspective view of a shoulder model of the present invention, showing a scope in a posterior portal and a subacromial space on a monitor, performed in accordance with the present invention.
Figure 5B:
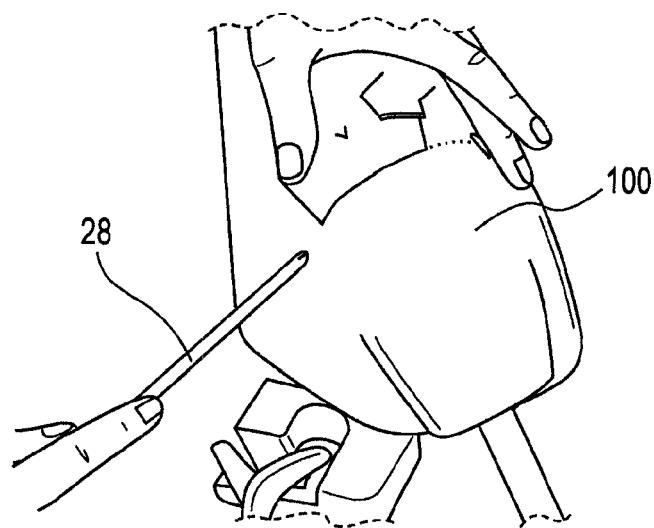
FIG. 5B illustrates a perspective view of a shoulder model of the present invention, showing a human hand inserting a trocar and sheath into a posterior portal, performed in accordance with the present invention.

As shown in FIG. 5A, an incision is made about 2 cm posterior and about 1 cm inferior to the posterior border of the acromion, with a blade 27, for example, a #11 blade, to a depth of about 2 cm. Next, a scope sheath (not shown) and blunt obturator 28 is inserted in a superior direction until the underside of the acromion can be felt, as shown in FIG. 5B. The obturator 28 (FIG. 5B) is removed and an arthroscope 29 is inserted into the sheath (not shown), as shown in FIG. 5C. The posterior cuff and subacromial space structures are viewed in a monitor 30. The arthroscope 29 is advanced anterolaterally while externally rotating the humerus to view the supraspinatus, rotator interval, and the subscapularis. Also, the coracoacromial (CA) ligament and coracoid are viewed in the monitor 30.

With this portal, a user is likely to see the undersurface of the acromion, the distal end of the clavicle, the undersurface of the AC joint, the subacromial bursa and the superior surface of the rotator cuff. This portal should traverse skin, subcutaneous tissue, posterior deltoid and joint capsule.

Glenohumeral Joint

Figure 5D:
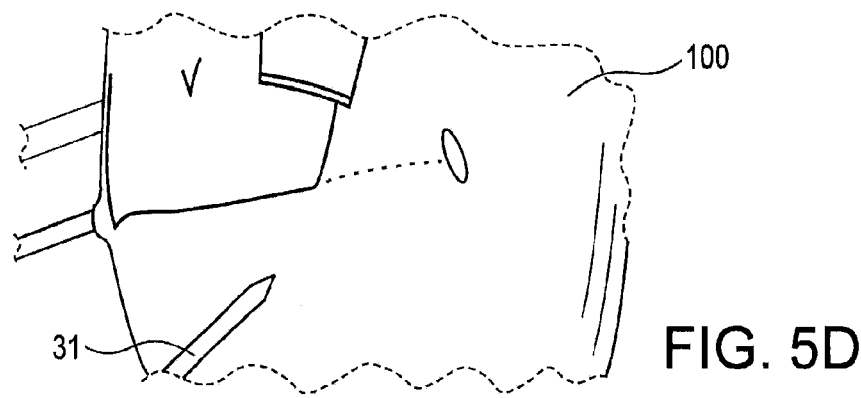
FIG. 5D illustrates a perspective view of a shoulder model of the present invention, showing a trocar being inserted into a posterior portal.
Figure 5E:
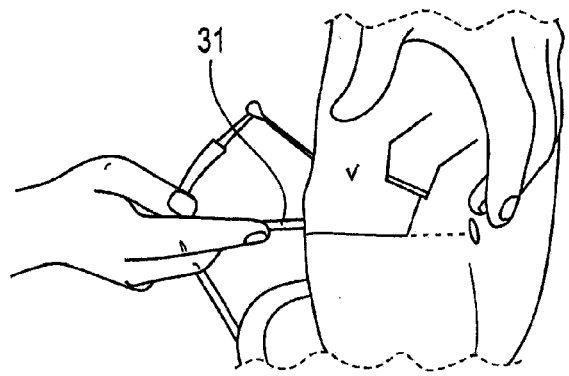
FIG. 5E illustrates a perspective view of a shoulder model of the present invention, showing a human hand inserting a trocar into the glenohumeral joint through a posterior portal, performed in accordance with the present invention.
Figures 5F, 5G:
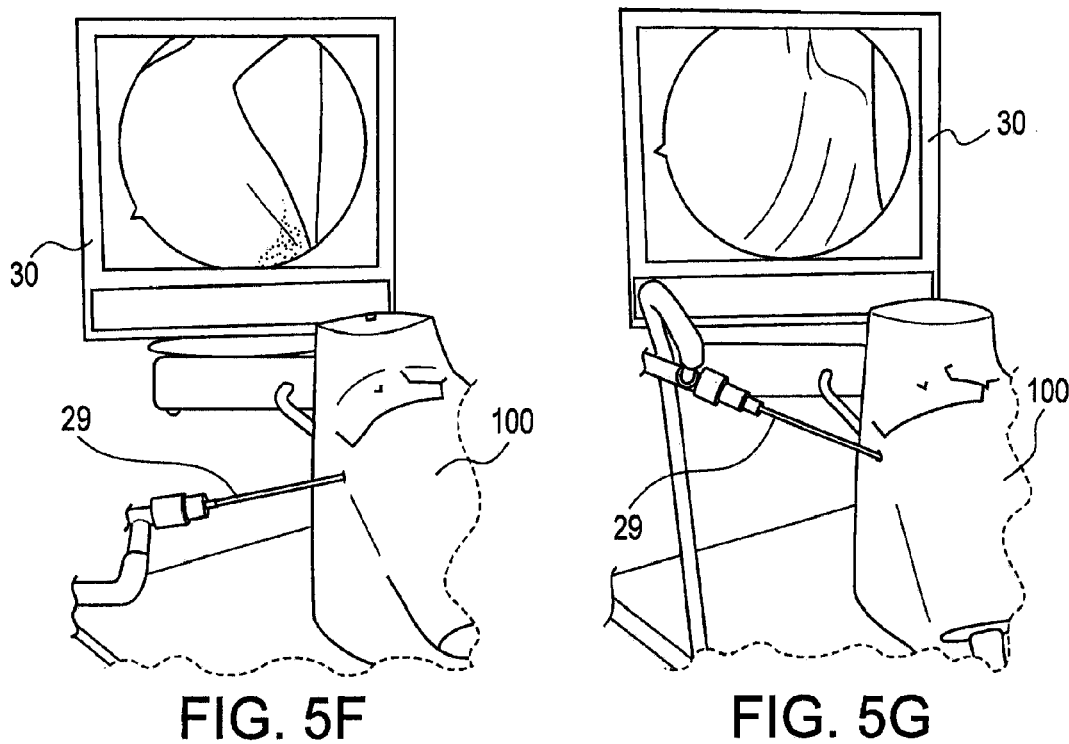
FIG. 5F illustrates a perspective view of a shoulder model of the present invention, showing a scope inserted through a posterior capsule for a superior look at the glenohumeral joint, performed in accordance with the present invention.
FIG. 5G illustrates a perspective view of a shoulder model of the present invention, showing a scope inserted through a posterior capsule for an inferior look at the glenohumeral joint, performed in accordance with the present invention.

Referring to FIGS. 5D-5E, a trocar 31 is inserted into the glenohumeral joint. The trocar 31 is removed and the arthroscope 29 and sheath are inserted through a posterior capsule from a standard posterior portal, as shown in FIG. 5F. The direction of insertion is anteromedial across the glenohumeral joint toward the coracoid process. The tactile feel of entering the joint space between the humeral head and the glenoid surface can be experienced by the surgeon. The surgeon proceeds as in cadaveric or live surgery, avoiding forced entry into the glenohumeral joint.

If the arthroscope 29 is in the subacromial space, the arthroscope 29 is pointed at a "dimple" molded into the posterior capsule (in the interval between the infraspinatus and teres minor). The arthroscope 29 is removed, while maintaining pressure on the sheath, and the capsule is punctured with a sharp instrument placed through the sheath. The sheath is advanced and the arthroscope 29 is replaced. The arthroscope 29 is inserted at an angle through the posterior capsule for a superior or an inferior look at the glenohumeral joint, as shown in FIGS. 5F-5G. The structural features including the glenoid, labrum, biceps tendon, humeral head, subscapularis tendon, superior glenohumeral ligament, middle glenohumeral ligament, inferior glenohumeral ligament, undersurface of the rotator cuff, and placation bands in the monitor 30, can be noted by the surgeon.

Portal Placement and Cannula Insertion into the Glenohumeral Joint

Standard Posterior Portal

Figure 6A:
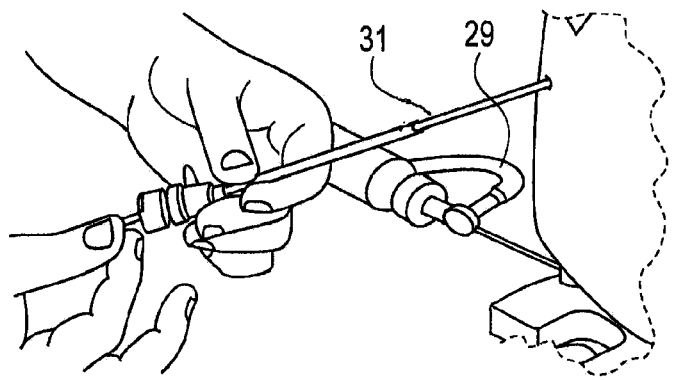
FIGS. 6A-6B illustrate the placement of a standard posterior portal and insertion of a cannula using a cannula/obturator with a switching stick, performed in accordance with the present invention.
Figure 6B:
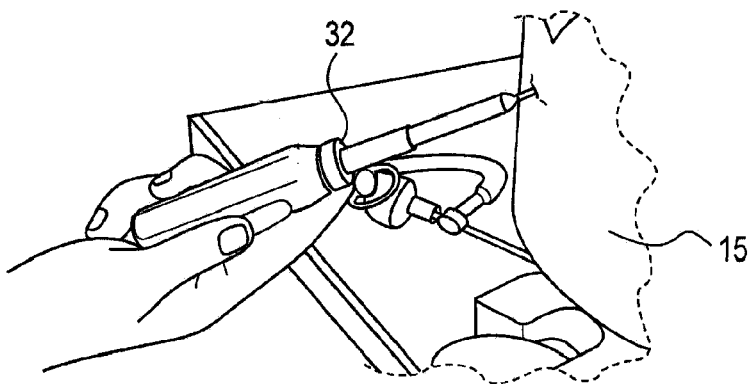

A trocar 31 (FIG. 5D) is inserted into the glenohumeral joint at a 9 o'clock position to create a posterior portal. The trocar 31 (FIG. 5D) is removed and the arthroscope 29 and sheath are inserted through the posterior portal. The direction of insertion is anteromedial across the glenohumeral joint toward the coracoid process. The arthroscope 29 is removed from the sheath. A switching stick 31 is placed through the sheath and into the glenohumeral joint, as shown in FIG. 6A. Next, the sheath is removed. Referring to FIG. 6B, a cannula 32, for example, a Crystal Cannula® sold by Arthrex, Inc., and its reusable obturator is placed over the switching stick 31 and the cannula 32 is inserted into the 9 o'clock position through the skin 15, soft tissue, and capsule into the glenohumeral joint.

Anterior Superior Portal (1 O'Clock Position)

Figure 6C:
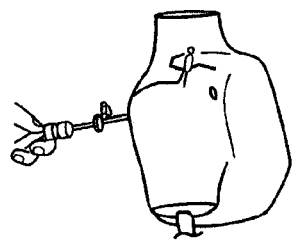
FIGS. 6C-6F illustrate stabbing through capsule from inside using a needle, scalpel, switching stick or a cannula/obturator, performed in accordance with the present invention.
Figures 1, 6C:
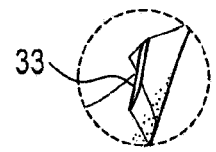
Figure 6D:
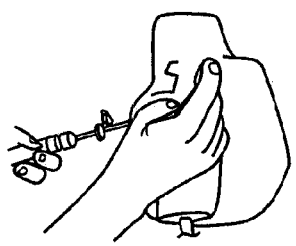
Figures 1, 6D:
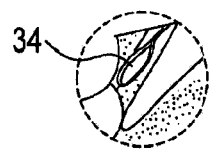
Figure 6E:
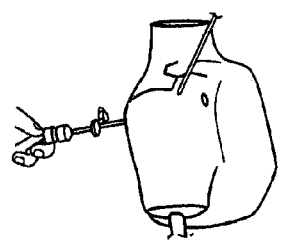
Figures 1, 6E:
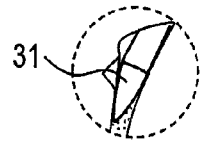

Looking at the shoulder model 100 from the standard posterior portal, a needle 33, for example, a spinal needle, is placed into the glenohumeral joint from a point just off the anterior corner of the acromion, as shown in FIG. 6C. The needle 33 should enter the glenohumeral joint behind the biceps tendon, about 1-2 cm lateral to its glenoid attachment. A small (about 3-4 mm) stab incision is made through the skin 15 (FIG. 2F), shoulder musculature 13 (FIG. 2E) and into the capsule at the position of the needle 33 with a blade, for example, a #11 blade, from the outside/in. The needle 33 and blade are removed, and a cannula 32 (FIG. 6B), for example, a Crystal Cannula®, is place in the usual progression of the needle 33. Alternatively, the capsule may be stabbed with a scalpel 34, a switching stick 31 or a cannula/obturator 35, as shown in FIGS. 6C-6F.

Anterior Inferior Portal (3 O'Clock Position)

Figure 6F:
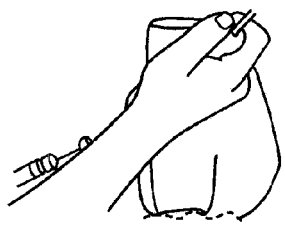
Figures 1, 6F:
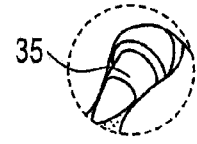

Viewing from the posterior portal a needle, for example, a spinal needle, is placed into the glenohumeral joint from a point near and just lateral to the coracoid process. The needle should enter the glenohumeral joint at the superior edge of the subscap tendon, about 2-3 cm lateral to the first cannula. A stab incision, about 3-4 mm, is made through the skin 15 (FIG. 2F), shoulder musculature 13 (FIG. 2E) and capsule at the position of the needle with a blade, for example, a #11 blade, from the outside/in. A cannula, preferably about 8.25 mm in diameter, is inserted in the usual progression of the needle. Alternatively, the capsule may be stabbed with a scalpel 34 (FIG. 6D), a switching stick 31 (FIG. 6E) or a cannula/obturator 35 (FIG. 6F).

Drive-Through Anterior Portal (2 O'Clock)

Figure 6G:
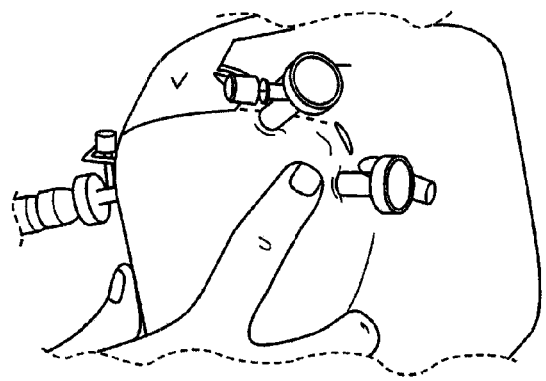
FIG. 6G shows a drive-through anterior portal location, performed in accordance with the present invention.
Figures 1, 6G:
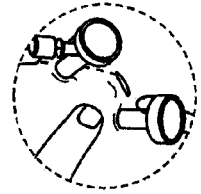
Figure 6H:
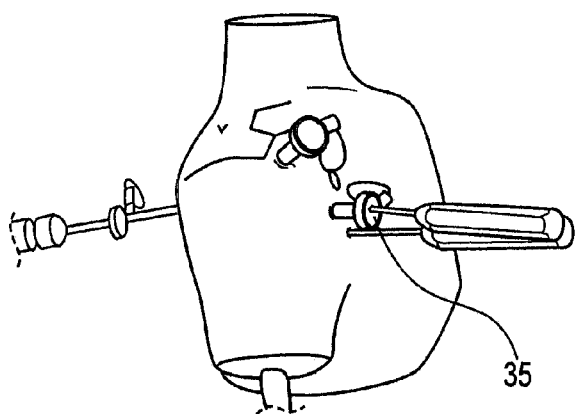
FIG. 6H shows two anterior cannulas and a percutaneous spear guide and trocar at 5 O'clock position, performed in accordance with the present invention.
Figures 1, 6H:
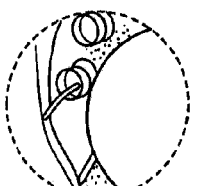

Typically, a drive-through anterior portal is used instead of the anterior superior portal and the anterior inferior portal, as described above. The glenohumeral joint is entered by inserting the arthroscope 29 (FIG. 6A) until a viewer can see, in a monitor 30 (FIG. 5G), the center of the rotator interval, about 2-3 cm lateral to the glenoid rim. The scope sheath is used to deliver a switching stick to a position to tent up the capsule, soft tissue and skin from the inside, at a point on the skin between the anterior corner of the acromion and the coracoid. A deep skin incision (about 5 mm) is made to expose and advance a tip of the switching stick. A cannula/obturator 35 is inserted over the switching stick from the outside/in, as shown in FIGS. 6G-6H.

Low Anterior Portal (5 O'Clock Position)

A low anterior portal (5 o'clock position) enters the glenohumeral joint about 2-3 cm lateral to a 3 o'clock cannula, and is frequently used for percutaneous anchor placement. A needle, for example, a spinal needle, is inserted in the 5 o'clock position. The improved angle toward the lower reaches of the anterior glenoid rim can be noted by the surgeon. A spear guide and sharp obturator are inserted, as shown in FIG. 6H.

Low Posterior Portal (7 O'Clock Position)

Figure 6I:
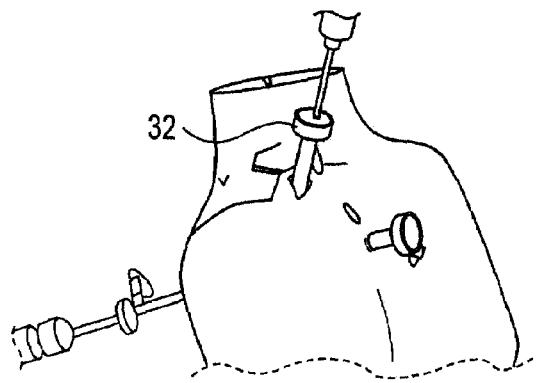
FIG. 6I shows a posterior portal and a spinal needle at 7 O'clock position, performed in accordance with the present invention.

A low posterior portal is placed from outside/in following the procedure described above, with the arthroscope 29 (FIG. 6A) in an anterosuperior portal. This portal is used by many surgeons for suture management when a single anterior portal such as a drive-through 2 o'clock is used. A cannula 32, preferably about 7 mm in diameter, is used, as shown in FIG. 6I.

Portal of Wilmington

Figure 6J:
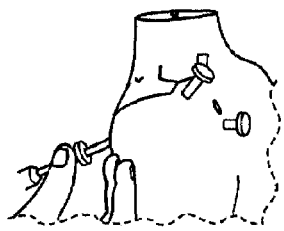
FIG. 6J shows a spinal needle through portal of Wilmington, performed in accordance with the present invention.
Figures 1, 6J:
Figure 6K:
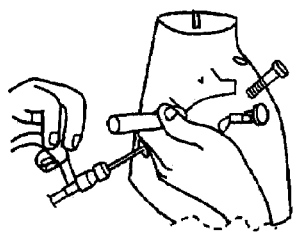
FIG. 6K shows a spear guide through a posterior Superior Labrum Anterior-Posterior (SLAP) position, performed in accordance with the present invention.
Figures 1, 6K:
Figure 6L:
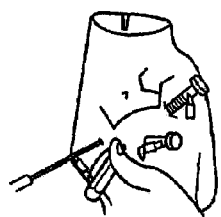
FIG. 6L shows a low posterior glenoid anchor position, performed in accordance with the present invention.
Figures 1, 6L:
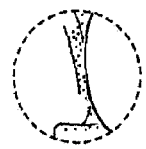

A portal of Wilmington is a percutaneous portal which enters the skin off the posterolateral corner of the acromion, and penetrates the muscular portion of the infraspinatus, as shown in FIG. 6J. Referring to FIGS. 6K-6L, the portal of Wilmington is perfectly suited for the posterior superior labrum anterior-posterior (SLAP) anchor placement, as well as low 7 o'clock anchor placement for posterior Bankart repairs.

Portal Placement and Cannula Insertion in the Subacromial Space

The posterior viewing portal cannula is backed out of the glenohumeral space to re-establish a view of the subacromial space.

Standard Lateral Portal

Following localization using a needle, preferably a spinal needle, as discussed above with reference to the standard posterior portal a mid-lateral portal (also referred to as "50 yard line" portal) is made about 2-3 cm lateral to the acromion, in line with the posterior edge of the AC joint, as shown in 7A. This portal is used for subacromial decompression, and ultimately provides a working portal for rotator cuff repair. Referring to FIG. 7B, the needle is placed into the subacromial space from a point near and just lateral to the acromion. Alternatively, a scalpel 34 may be used, as shown in FIG. 7C. A cannula, preferably about 8.25 mm in diameter, is placed at an angle which allows in-line access to the torn cuff tissue edge. Referring to FIG. 7D, the cannula may be used with a disposable obturator 35.

Anterior Portal

The anterior portal is placed according to the purpose it must serve. Typically, the portal is placed according to considerations which include angle of incidence with rotator cuff pathology, and position relative to the AC joint.

Off-Acromion Percutaneous Access

Referring to FIG. 7F, needles, preferably spinal needles, are placed at the lateral border of the acromion, toward the medial row anchor sites. This portal provides excellent access for medial rotator cuff anchors at the articular margin along the lateral border of the acromion.

Modified Neviaser Portal

Referring to FIG. 7G, a point medial to the acromion and posterior to the AC joint is marked. The "notch" offers excellent percutaneous access to the rotator cuff.

Creating and Repairing Labral Disruption

By design, the labrum in the shoulder model 100 (FIG. 2L) of the present invention is not strongly affixed to the glenoid rim. A simple reattachment—Bankart and superior labrum anterior-posterior (SLAP) repair—may be easily accomplished with little or no release required. Significant labral shift/capsular plication exercises, may require slight release of the medial glenoid-labral attachment, due to the tight model assembly and a strong adhesive bond at the base of the glenoid component. The tight model assembly, however, allows for fluid arthroscopy.

Subsequent to performing a labral disruption in the shoulder model, the repair of the labrum is performed. First, the labrum is viewed through the viewing portal and assess the disruption. An arthroscopic grasper is used to place a suture anchor to reattach the labrum to the anterior glenoid rim.

Creating and Repairing Rotator Cuff Tear

A preferred method for creating a rotator cuff tear involves disassembling the model to create the desired tear. Referring to FIGS. 8A-8D, in this method, a scissor 36 is used to cut the rotator cuff 37 by hand to view the anterior and the posterior "L" and the massive cuff tear.

Figure 8A:
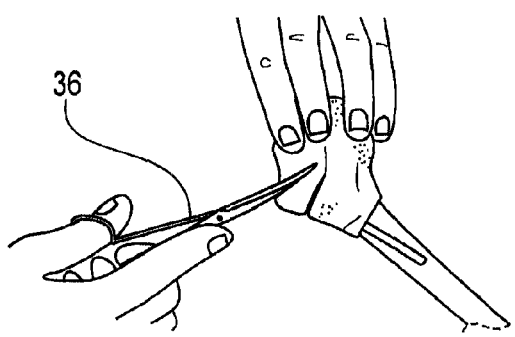
FIGS. 8A-8D shows a method of creating a rotator cuff tear with a scissor, performed in accordance with the present invention.
Figure 8B:
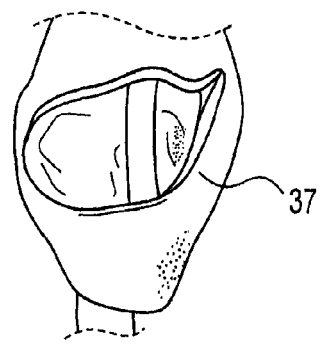
Figure 8C:
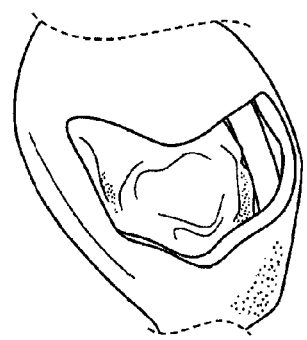
Figure 8D:
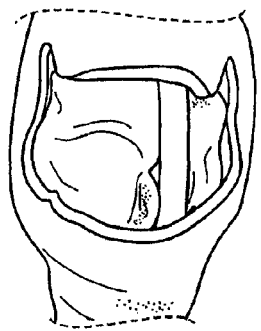
Figure 8E:
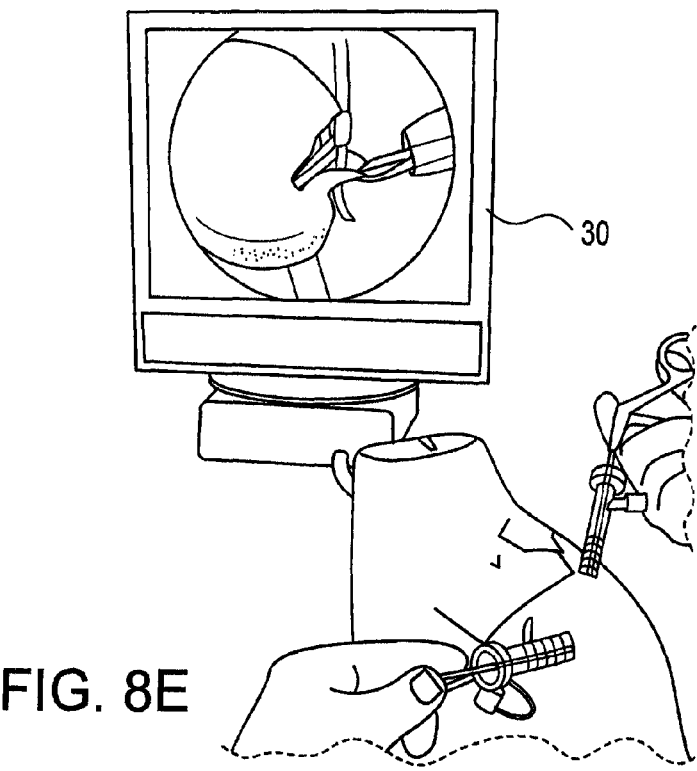
FIG. 8E shows an arthroscopic method for creating a rotator cuff tear from anterior portal using arthroscopic scissors or forceps, performed in accordance with the present invention.

In an another preferred method, a rotator cuff tear is created. An arthroscopic grasper placed into the lateral portal with arthroscopic scissors or forceps from an anterior portal enables the user to complete the desired crescent shaped tear, as shown in FIG. 8E. Alternatively, an arthroscopic grasper placed into an anterolateral portal with a blade, preferably a #11 blade, may be used to complete the rotator cuff tear.

Subsequent to performing a rotator cuff tear in the shoulder model, the repair of the rotator cuff is performed. First, the rotator cuff is viewed through the viewing portal and assess the size and pattern of the tear. Any fragmented portions of the tendon—supraspinatus, subscapularis, infraspinatus, and teres minor—are removed. If the tear is small, an arthroscopic grasper is used to place a metal or plastic anchor with attached sutures to secure the torn tendon. If the tear is large, sutures are passed through the tendon ends using an arthroscopic stitch passer and grasper and tie the sutures using an arthroscopic knot tying instrument.

While the present invention is described herein with reference to illustrative embodiments for particular applications, it should be understood that the invention is not limited thereto. Those having ordinary skill in the art and access to the teachings provided herein will recognize additional modifications, applications, embodiments and substitution of equivalents all fall within the scope of the invention. Accordingly, the invention is not to be considered as limited by the foregoing description.

What is claimed is:

1. A shoulder model for experimental procedures, comprising:
    a shoulder assembly, the shoulder assembly comprising:
    a joint capsule assembly;
    a scapula and mounting post;
    an acromioclavicular joint assembly, the acromioclavicular joint assembly, the joint capsule assembly and the scapula and mounting post being secured together, wherein bones of the acromioclavicular joint assembly, the joint capsule assembly and the scapula are formed of a material comprising foam-cortical shell;
    a labrum glenoid assembly;
    a shoulder musculature, the shoulder musculature having a hollow inside capable of accommodating the shoulder assembly, and formed of a material comprising foam; and
    a skin forming a tight seal around the shoulder musculature.

2. The shoulder model of claim 1, further comprising a base, the base being attached to the scapula and mounting post, and the base being made of a polymer material.

3. The shoulder model of claim 1, wherein the skin is formed of a vinyl material.

4. The shoulder model of claim 1, wherein the labrum glenoid assembly is formed of a material comprising thermoplastic elastomers.

5. A method of performing an experimental arthroscopic procedure on a simulated rotator cuff, comprising:
    mounting a shoulder model on a mount and securing the shoulder model to the mount, the shoulder model comprising:
    a shoulder assembly, the shoulder assembly comprising:
    a joint capsule assembly;
    a scapula and mounting post;
    an acromioclavicular joint assembly, the acromioclavicular joint assembly, the joint capsule assembly and the scapula and mounting post being secured together, wherein bones of the acromioclavicular joint assembly, the joint capsule assembly and the scapula are formed of a material comprising foam-cortical shell;
    a labrum glenoid assembly;
    a shoulder musculature, the shoulder musculature having a hollow inside capable of accommodating the shoulder assembly, and formed of a material comprising foam; and
    a skin forming a tight seal around the shoulder musculature;
    making anatomical references on the shoulder model;
    establishing a viewing portal in a posterior side of the shoulder model;
    creating at least one additional portal and inserting a cannula in the additional portal, the additional portal being used to pass arthroscopic instruments; and
    creating a rotator cuff tear using arthroscopic scissors; and repairing the rotator cuff tear.

6. The method of claim 5, wherein the mount is a flat surface and the step of mounting the shoulder model comprises mounting the shoulder model in a beach chair position by securing a base of the shoulder model to the flat surface.

7. The method of claim 5, wherein the step of mounting the shoulder model comprises mounting the shoulder model in a lateral decubitus position.

8. The method of claim 5, wherein the step of making anatomical references comprises outlining borders of acromion, distal clavicle, and acromioclavicular joint using a marker; marking coracoid process, and marking a "V" at a medial border of the acromion midpoint between the acromioclavicular joint and scapular spine.

9. The method of claim 5, wherein the step of establishing a viewing portal comprises making an incision about 2 cm posterior and about 1 cm inferior to posterior border of acromion.

10. The method of claim 9, wherein the incision is about 1 cm and has a depth of about 2 cm.

11. The method of claim 8, further comprising inserting a scope sheath and obturator in a superior direction until the obturator touches an underside of the acromion; removing the obturator; and inserting an arthroscope into the sheath.

12. The method of claim 8, further comprising inserting a trocar into a glenohumeral joint; removing the trocar; inserting an arthroscope and sheath anteromedial across the glenohumeral joint toward the coracoid.

13. The method of claim 5, wherein the step of creating an additional portal comprises:

placing a needle into a glenohumeral joint from a point just off an anterior corner of acromion and the needle entering the glenohumeral joint behind biceps tendon about 1-2 cm lateral to glenoid;

making a stab incision of about 3-4 mm through the skin and shoulder musculature of the shoulder model and into a capsule, and removing the needle and incision instrument; and inserting a cannula.

14. The method of claim 5, wherein the step of creating an additional portal comprises:

placing a needle into a glenohumeral joint from a point near and just lateral to coracoid process and the needle entering the glenohumeral joint at a superior edge of subscap tendon about 2-3 cm lateral to a cannula formed behind biceps tendon about 1-2 cm lateral to glenoid;

making a stab incision of about 3-4 mm through the skin and shoulder musculature of the shoulder model and into a capsule using an incision instrument, and removing the needle and incision instrument; and inserting a cannula in an usual progression of the needle, the cannula having a diameter of about 8.25 mm.

15. The method of claim 5, wherein the step of repairing the rotator cuff tear comprises:

viewing the rotator cuff through the viewing portal;

removing fragmented portions of tendon; and passing sutures through tendon ends using an arthroscopic stitch passer and grasper, and tying the sutures using an arthroscopic knot tying instrument.

16. The method of claim 5, wherein the step of repairing the rotator cuff tear comprises: viewing the rotator cuff through the viewing portal; removing fragmented portions of tendon; and securing the tendon with a suture anchor.

* * * * *